(12) United States Patent
Chan et al.

(10) Patent No.: US 12,400,300 B2
(45) Date of Patent: Aug. 26, 2025

(54) METHOD OF APPLYING ATMOSPHERIC TURBULENCE DISTURBANCES TO IMAGES

(71) Applicant: Purdue Research Foundation, West Lafayette, IN (US)

(72) Inventors: Stanley Chan, West Lafayette, IN (US); Nicholas Chimitt, West Lafayette, IN (US); Zhiyuan Mao, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 384 days.

(21) Appl. No.: 18/134,085

(22) Filed: Apr. 13, 2023

(65) Prior Publication Data
US 2023/0334628 A1 Oct. 19, 2023

Related U.S. Application Data

(60) Provisional application No. 63/330,555, filed on Apr. 13, 2022.

(51) Int. Cl.
*G06T 5/70* (2024.01)
*G06T 5/20* (2006.01)

(52) U.S. Cl.
CPC .......... *G06T 5/70* (2024.01); *G06T 5/20* (2013.01); *G06T 2207/20084* (2013.01)

(58) Field of Classification Search
CPC ... G06T 5/70; G06T 5/20; G06T 2207/20084; G06T 5/60; G06T 5/73;
(Continued)

(56) References Cited

U.S. PATENT DOCUMENTS

2012/0288212 A1* 11/2012 Arrasmith ............ H04N 23/00 382/260
2013/0279759 A1* 10/2013 Kagarlitsky ........ G06V 30/1902 382/105
2015/0332443 A1* 11/2015 Yamada .................. H04N 5/21 382/274
2019/0295234 A1* 9/2019 Takikawa ................ G06T 5/73
2020/0167885 A1* 5/2020 Kimura .................. G06T 7/001
2024/0331362 A1* 10/2024 Ouyang ............... G06V 10/774

FOREIGN PATENT DOCUMENTS

CN 110400280 A * 11/2019 ............ G06T 5/001
CN 111427147 A * 7/2020 ................ G01J 9/00
(Continued)

OTHER PUBLICATIONS

Basu et al., Estimation of the path averaged atmospheric refractive index structure constant from time lapse imagery. In Proc. SPIE 9465, Laser Radar Technology and Applications XX; and Atmospheric Propagation XII, pp. 1-9, May 2015.
(Continued)

*Primary Examiner* — Jose L Couso
(74) *Attorney, Agent, or Firm* — Piroozi-IP, LLC (57) ABSTRACT

An image generator engine for generating distorted images from an input image is disclosed which includes a random seed generator adapted to generate random seeds, a model adapted to receive the random seeds and generate a first plurality of sets of Zernike coefficients (FPSZC), a pixel shifter adapted to shift pixels of the input image, a phase to space (P2S) transformer adapted to in parallel receive the FPSZC and generate a predetermined number of P2S coefficients, a learned basis function generator adapted to generate learned basis function matrices, a convolver adapted to convolve each pixel of the tilted image by the learned basis functions thereby generating a plurality of convolved pixels, and a blurrer adapted to receive the plurality of the convolved pixels and multiply by the corresponding P2S coefficients and apply a summation to generate the distorted image.

20 Claims, 9 Drawing Sheets
(8 of 9 Drawing Sheet(s) Filed in Color)

(58) Field of Classification Search
CPC ... G06T 2207/20081; G06T 5/50; G06T 5/80; G06T 2207/10016; G06T 2207/10152; G06T 2207/30192; G06T 2207/30232; G06T 3/18; G06T 7/0002; G06T 3/4046; G06T 9/002; G06T 2207/20076; G02B 27/0025; G06V 10/24; G06V 10/761; G06V 20/13; G06V 10/454; G06V 10/54; G06V 10/774; G06V 10/82; G06V 20/41; G06V 30/18057; G06V 20/698; G06V 30/19173; H04N 5/21; H04N 23/23; H04N 25/60; H04N 1/00976; H04N 1/6091; H04N 21/42202; G06N 3/02; G06N 3/08–088; G06N 3/0445; G06N 3/0454; G06N 3/0464; G06N 3/4046; G06N 3/4053; G06N 7/00; G06N 7/01; G06N 20/00; G06K 7/1482; G06F 18/214; G06F 18/22; G06F 18/241; G06F 18/24; G06F 18/2411; G06F 18/2415; G06F 30/27; Y10S 128/925
See application file for complete search history.

(56) References Cited

FOREIGN PATENT DOCUMENTS

CN     113643220 A  *  11/2021  ............... G06T 5/50
CN     113888418 A  *  1/2022   ............ G06F 18/214

OTHER PUBLICATIONS

Chanan et al., Calculation of wave-front tilt correlations associated with atmospheric turbulence. Journal of Optical Society of America A, 9(2):298-301, Feb. 1992.
Takato et al., Spatial correlation of Zernike phase-expansion coefficients for atmospheric turbulence with finite outer scale. Journal of Optical Society of America A, 12(5):958-963, May 1995.
Roddier, "Atmospheric wavefront simulation using Zernike polynomials," Optical Engineering 29(10), Oct. 1, 1990.
Bos et al., "Simulation of extended scenes imaged through turbulence over horizontal paths," Proc. SPIE 8161, Atmospheric Optics IV: Turbulence and Propagation, 816106, Sep. 6, 2011.

* cited by examiner

METHOD OF APPLYING ATMOSPHERIC TURBULENCE DISTURBANCES TO IMAGES

CROSS-REFERENCE TO RELATED APPLICATIONS

The present patent application is related to and claims the priority benefit of U.S. Provisional Patent Application Ser. No. 63/330,555 filed Apr. 13, 2022, the contents of which are hereby incorporated by reference in its entirety into the present disclosure.

STATEMENT REGARDING GOVERNMENT SUPPORT

This invention was made with government support under U.S. Pat. No. 2,133,032 and ECCS 2030570 awarded by the National Science Foundation. The government has certain rights in the invention.

TECHNICAL FIELD

The present disclosure generally relates to image reconstruction, and in particular to a method of applying atmospheric turbulence disturbances to images to be used as training and testing input images to image reconstruction systems.

BACKGROUND

This section introduces aspects that may help facilitate a better understanding of the disclosure. Accordingly, these statements are to be read in this light and are not to be understood as admissions about what is or is not prior art.

Nowadays, there are a number of optical systems that are employed to obtain images from high altitudes and long distances. For example, surveillance cameras are deployed to analyze infrastructures, traffic patterns, and human identities. Each such camera includes high resolution image capture devices that are utilized to capture images from very long distances. These images are distorted due to atmospheric distortions. Onboard systems or downstream systems are then tasked with reconstructing images by removing such distortions.

However, despite several decades of research, the aforementioned distortion removal systems utilized for imaging through atmospheric turbulence remains an open problem in optics and image processing. The challenge is not only in reconstructing images from a stack of distorted frames but also in a less known image formation model that can be used to formulate and evaluate image reconstruction algorithms such as deep neural networks. Such deep neural networks require training data which include simulated distortions added to initial images that can then be used to compare against reconstructed images. Simulating images distorted by atmospheric turbulence has received considerable attention in the optics community, however the existing optics simulation methods are designed for specific applications such as high-energy optical communications. The field of view, complexity of the scene, and demand of the simulation speed are never considered. Using simulators to develop deep learning image reconstruction algorithms is a present challenge as there is no physically justifiable approach to synthesize large-scale datasets at a low computational cost for training and testing said neural networks, while meeting the need of a large field of view, complex scene, speed, and volume. In other words, there has been a significant computation cost and associated challenge to add distortion based on atmospheric models to raw images to be used by said neural networks.

Therefore, there is an unmet need for a novel method/system to simulate atmospheric disturbances applied to input images to be used as training images for image reconstruction systems based on atmospheric models without a significant computation cost.

SUMMARY

An image generator engine for generating distorted images from an input image is disclosed. The engine includes a random seed generator adapted to generate a first plurality of sets of random seeds (FPSRS), the number of sets of random seeds corresponds to the number of pixels in the input image, an atmospheric disturbance model adapted to receive the FPSRS and in response thereto generate a first plurality of sets of Zernike coefficients (FPSZC), each set of Zernike coefficients of the FPSZC corresponding to an associated set of random seeds of the FPSRS, and each set of Zernike coefficients of the FPSRS and each set of random seeds of the FPSRS comprising a plurality of corresponding entries, a pixel shifter adapted to receive in parallel a subset of the entries of the FPSZC and the input image, and in response thereto shift the corresponding pixel of the input image to thereby generate a tilted image, a phase to space (P2S) transformer adapted to in parallel receive remainder of entries (RoE) of the FPSZC and in response generate a predetermined number of P2S coefficients (PNP2SC) defining a non-linear mapping of the plurality of sets of Zernike coefficients to associated point spread functions (PSFs) basis coefficients, a learned basis function generator adapted to receive tilt-free PSFs from a plurality of PSFs generated corresponding to a second plurality of sets of Zernike coefficients (SPSZC) generated from the atmospheric disturbance model receiving a second plurality of sets of random seeds (SPSRS), wherein each set of Zernike coefficients of the SPSZC corresponding to an associated set of random seeds of the SPSRS, and each set of Zernike coefficients of the SPSZC and each set of random seeds of the SPSRS comprising a plurality of corresponding entries and perform a principal component analysis on the tilt-free PSFs, thereby generating the learned basis functions represented as PNP2SC matrices, a convolver adapted to convolve each pixel of the tilted image by the learned basis functions thereby generating a plurality of convolved pixels, and a blurrer adapted to receive the plurality of the convolved pixels and multiply by the corresponding P2S coefficients and apply a summation to generate the distorted image.

A method of generating distorted images from an input image is also disclosed. The method includes generating a first plurality of sets of random seeds (FPSRS), the number of sets of random seeds corresponds to the number of pixels in the input image, modeling atmospheric disturbances by applying an atmospheric disturbance model adapted to receive the FPSRS and in response thereto generate a first plurality of sets of Zernike coefficients (FPSZC), each set of Zernike coefficients of the FPSZC corresponding to an associated set of random seeds of the FPSRS, and each set of Zernike coefficients of the FPSRS and each set of random seeds of the FPSRS comprising a plurality of corresponding entries, shifting pixels in the input image by a pixel shifter adapted to receive in parallel a subset of the entries of the FPSZC and the input image, and in response thereto shift the corresponding pixel of the input image to thereby generate a tilted image, applying a phase to space (P2S) transformer adapted to in parallel receive remainder of entries (RoE) of the FPSZC and in response generate a predetermined number of P2S coefficients (PNP2SC) defining a non-linear mapping of the plurality of sets of Zernike coefficients to associated point spread functions (PSFs) basis coefficients, generating a learned basis function by a learned basis function generator adapted to receive tilt-free PSFs from a plurality of PSFs generated corresponding to a second plurality of sets of Zernike coefficients (SPSZC) generated from the atmospheric disturbance model receiving a second plurality of sets of random seeds (SPSRS), wherein each set of Zernike coefficients of the SPSZC corresponding to an associated set of random seeds of the SPSRS, and each set of Zernike coefficients of the SPSZC and each set of random seeds of the SPSRS comprising a plurality of corresponding entries and perform a principal component analysis on the tilt-free PSFs, thereby generating the learned basis functions represented as PNP2SC matrices, convolving by a convolver each pixel of the tilted image by the learned basis functions thereby generating a plurality of convolved pixels, and applying a blurrer adapted to receive the plurality of the convolved pixels and multiply by the corresponding P2S coefficients and apply a summation to generate the distorted image.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIGS. 7A, 7B, and 7C are images which depict two qualitative reconstruction, specifically.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

Figure 1A:
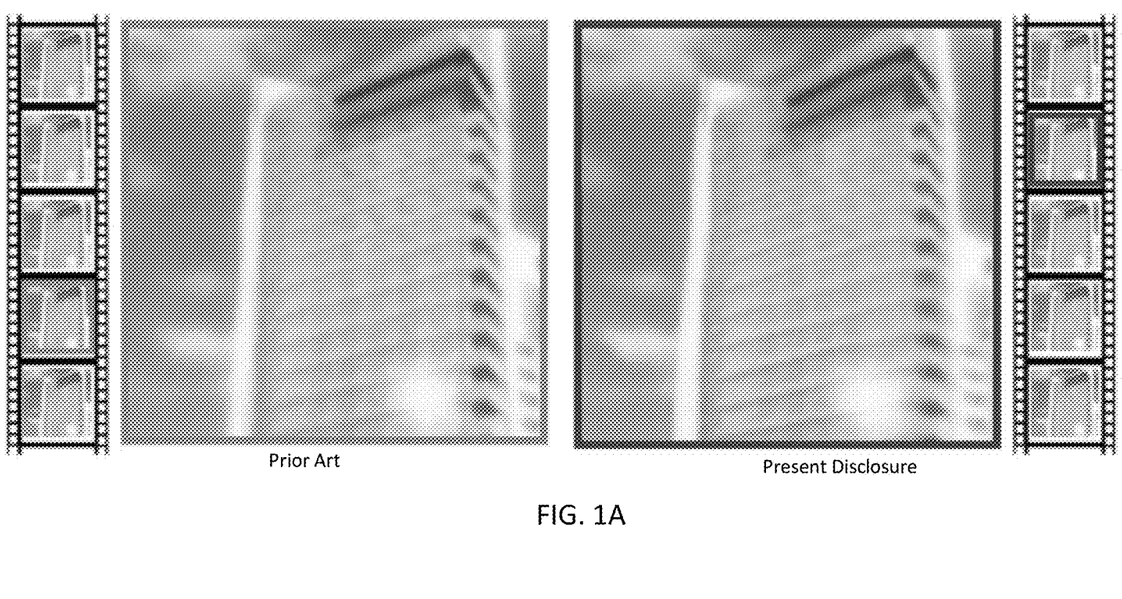
FIG. 1A depicts two images comparing a mainstream prior art distorted image to the distorted image resulting from the present disclosure.

A novel approach is disclosed to simulate atmospheric disturbances applied to input images to be used as training images for image reconstruction systems based on atmospheric models without a significant computation cost associated with prior art approaches. Towards this end, a fast and accurate methodology is disclosed herein to generate a dense-grid image distorted by turbulence with theoretically verifiable statistics. The simulator includes mostly op-tics/signal processing steps and a lightweight shallow neural network to carry out a novel concept referred to herein as the Phase-to-Space (P2S) transform. By parallelizing the computation across pixels, the disclosed methodology the simulator offers a 1000× speed-up compared to the mainstream approach in this field shown in FIG. 1A (where a comparison of mainstream prior art distorted image is shown in comparison to the distorted image from the present disclosure) and a 16×-220× speed-up (CPU and GPU gains in speed, respectively) as compared to the inventor's previous work. Specifically, the prior art methodology responsible for the image in FIG. 1A requires 24.36 sec/frame (GPU) for a resolution of 256×256 pixels while the distorted image according to the present disclosure requires only 0.026 sec/frame (GPU) for a resolution of 256×256 pixels representing a new turbulence simulator that is substantially (1000×) faster than the prior art, while preserving the essential turbulence statistic.

Figure 1B:
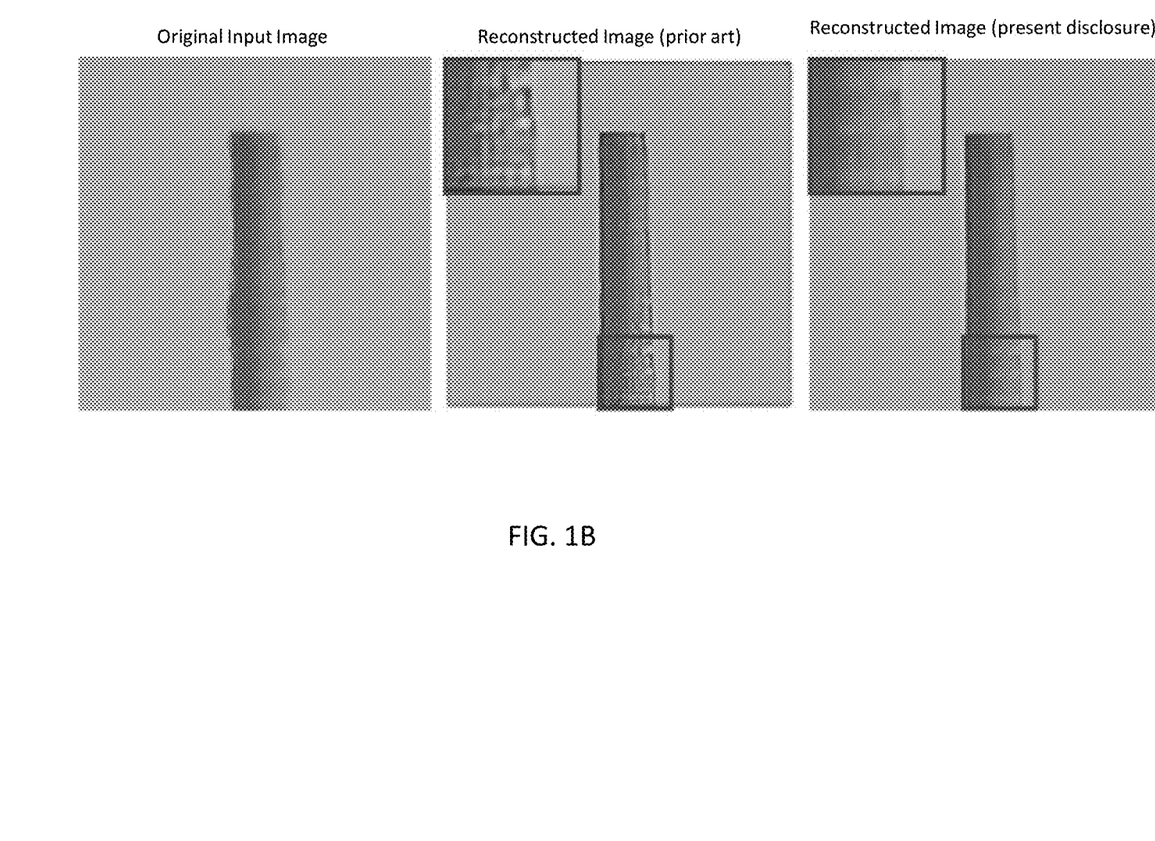
FIG. 1B depicts an original input image which is compared with a reconstructed image using an image reconstruction system using the prior art input image dataset and with a reconstructed image from the same image reconstruction system but with an input image dataset from the image generator engine of the present disclosure.

Additionally, using the methodology of the present disclosure to synthesize the aforementioned training set for training an image reconstruction network offers a considerable amount of improvement in image quality of the reconstructed images. Specifically, when using the image generator engine of the present disclosure to synthesize training data to train a deep neural network image reconstruction model, the resulting network outperforms the same architecture trained with data synthesized by a less sophisticated image generator, as illustrated in FIG. 1B where an original input image is compared with a reconstructed image using an image reconstruction system using the prior art input image dataset and with a reconstructed image from the same image reconstruction system but with an input image dataset from the image generator engine of the present disclosure. Inspection of FIG. 1B reveals the improved quality of the reconstructed image as compared to the original image.

To better convey a description of the image generator engine of the present disclosure several high-level concepts are first discussed. The first concept is spatially varying convolution via basis functions. While conventional approaches model the turbulence distortion as a spatially varying convolution, the present disclosure reformulates the problem by modeling the distortion as a sum of spatially invariant convolutions. In other words, a basis representation of point spread functions (PSFs) is used in these spatially invariant convolutions. Second, is the concept of learning the basis function. As discussed with respect to the convolution via basis function, to enable the previous idea, first the basis functions need to be identified. The basis functions are determined by drawing Zernike phase coefficient samples for all high-order aberrations, followed by the PSF formation equation. This creates a dataset which contains PSFs of the proper statistics for atmospheric turbulence. Then, principal component analysis is performed on the dataset to construct the basis functions. An important connection between these two concepts is the relationship between the basis coefficients in the phase and spatial domains. This is an open problem, and there is no known analytic solution. The present disclosure circumvents this difficulty by introducing a new concept known as the Phase-to-Space transform. To do so, a lightweight shallow neural network is constructed to transform from the phase domain coefficients to the spatial domain PSF coefficients. Integrating this network into the two aforementioned ideas, our overall engine adheres to the physical concepts while offering significant speed up and additional reconstruction utility.

Figure 1C:
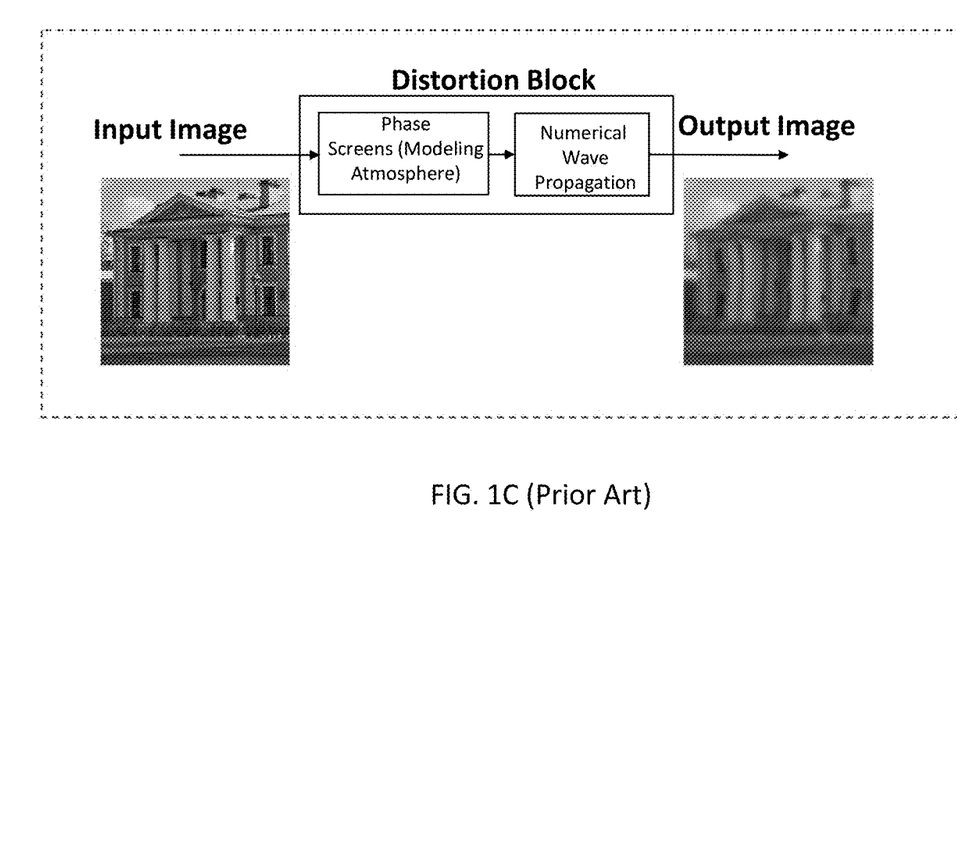
FIG. 1C is a block diagram which depicts the basic approach in the prior art for generating images that emulate atmospheric disturbances to be used with an image reconstruction system.

With these basic concepts introduced, reference is now made to FIG. 1C which depicts the basic approach in the prior art for generating images that emulate atmospheric disturbances to be used with an image reconstruction system. An input image is fed to a distortion block which includes at a high level two blocks within it: 1) 2-dimensional phase screens which model the atmospheric turbulence distortions by a set of physical parameters; and 2) a numerical wave propagation which propagates the image in a sequential fashion through each phase screen, a discrete equivalent to the true physical process of nature. The numerical wave propagation block represents a substantial computational cost which is one source of motivation of the method/system of the present disclosure.

Figure 2:
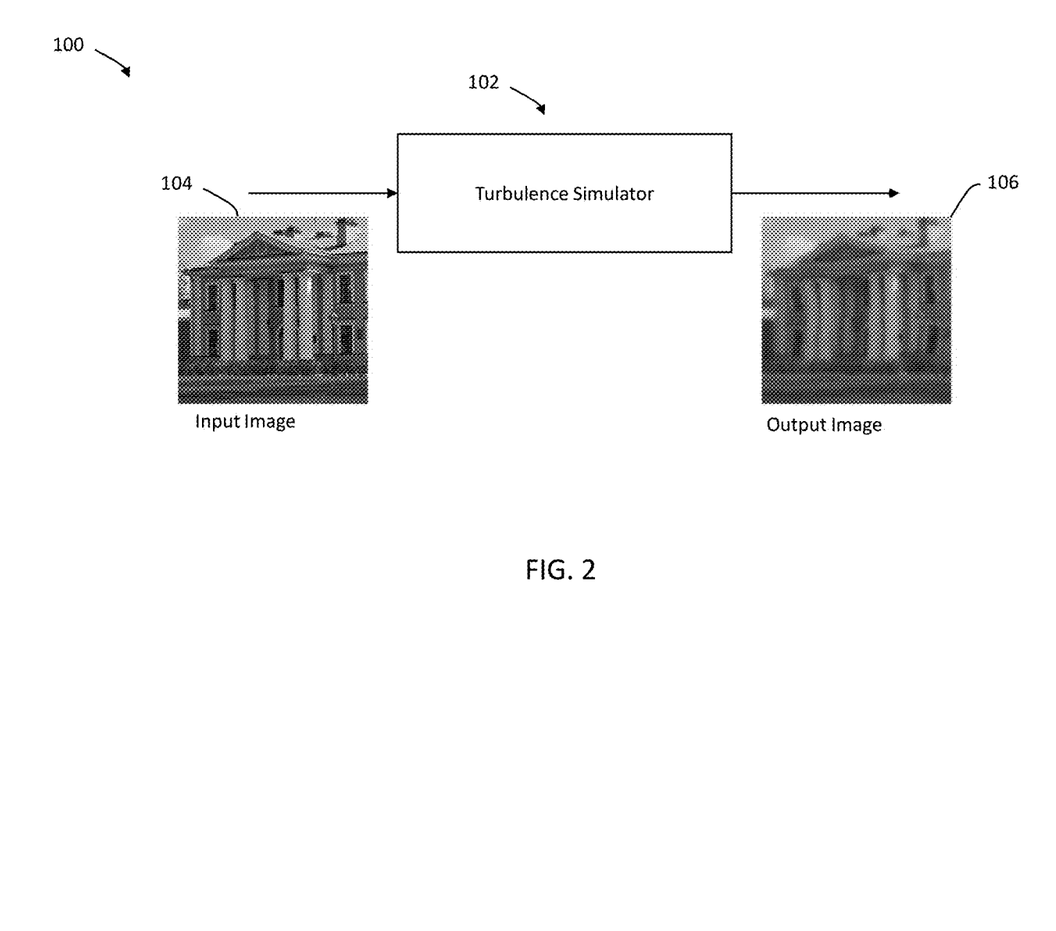
FIG. 2 is a basic block diagram depicting the operations of the method/system of the present disclosure.

Referring to FIG. 2, is a basic block diagram depicting the operations of the present disclosure. Specifically, a method/system 100 is depicted which provides a turbulence simulator 102 applied to an input image 104 to generate a distorted atmospheric turbulence impacted output image 106. This output image 106 is thus provided as a training image to the image reconstruction system to generate a reconstructed image that is similar to the input image 104.

Figure 3:
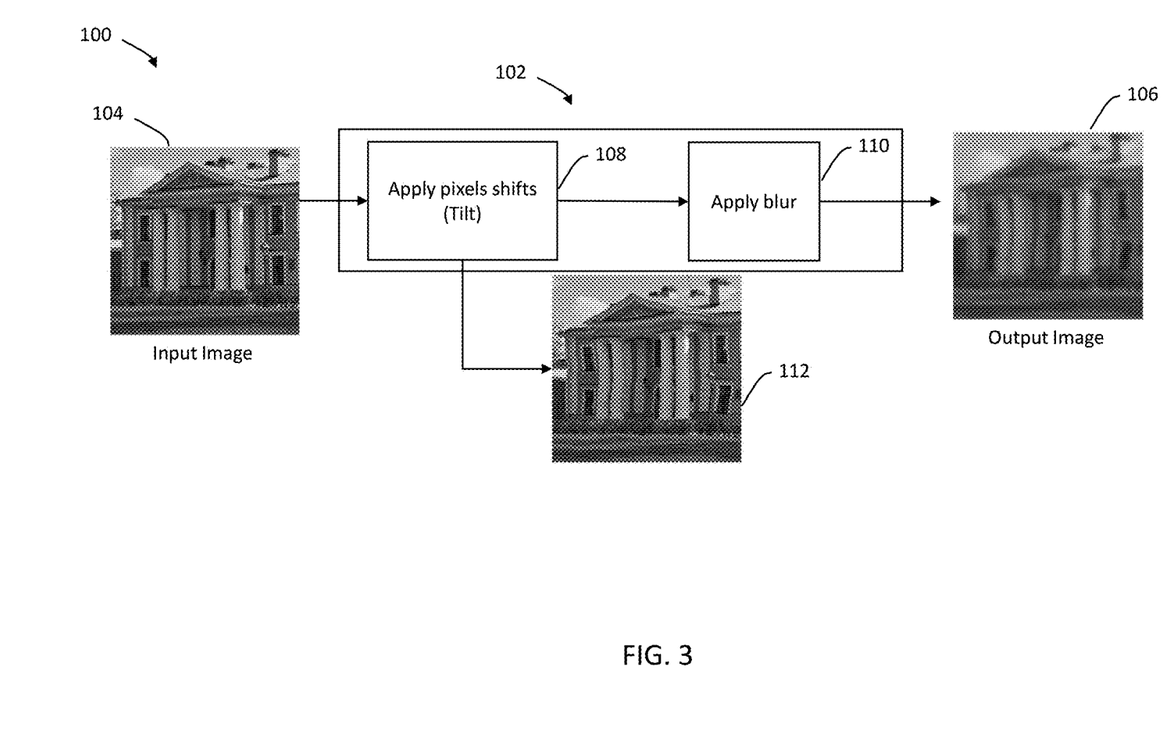
FIG. 3 is another block diagram which breaks downs the block diagram shown in FIG. 2 into two blocks including: apply pixel shifts (i.e., tilt), and apply blur block.

Referring to FIG. 3, the method/system 100 is further broken down into two blocks apply pixel shifts (i.e., tilt) as shown by block 108 and apply blur block 110. The output of apply pixel shifts block is shown as image 112, as known to a person having ordinary skill in the art. The relationship between these blocks will become clearer below.

Figure 4:
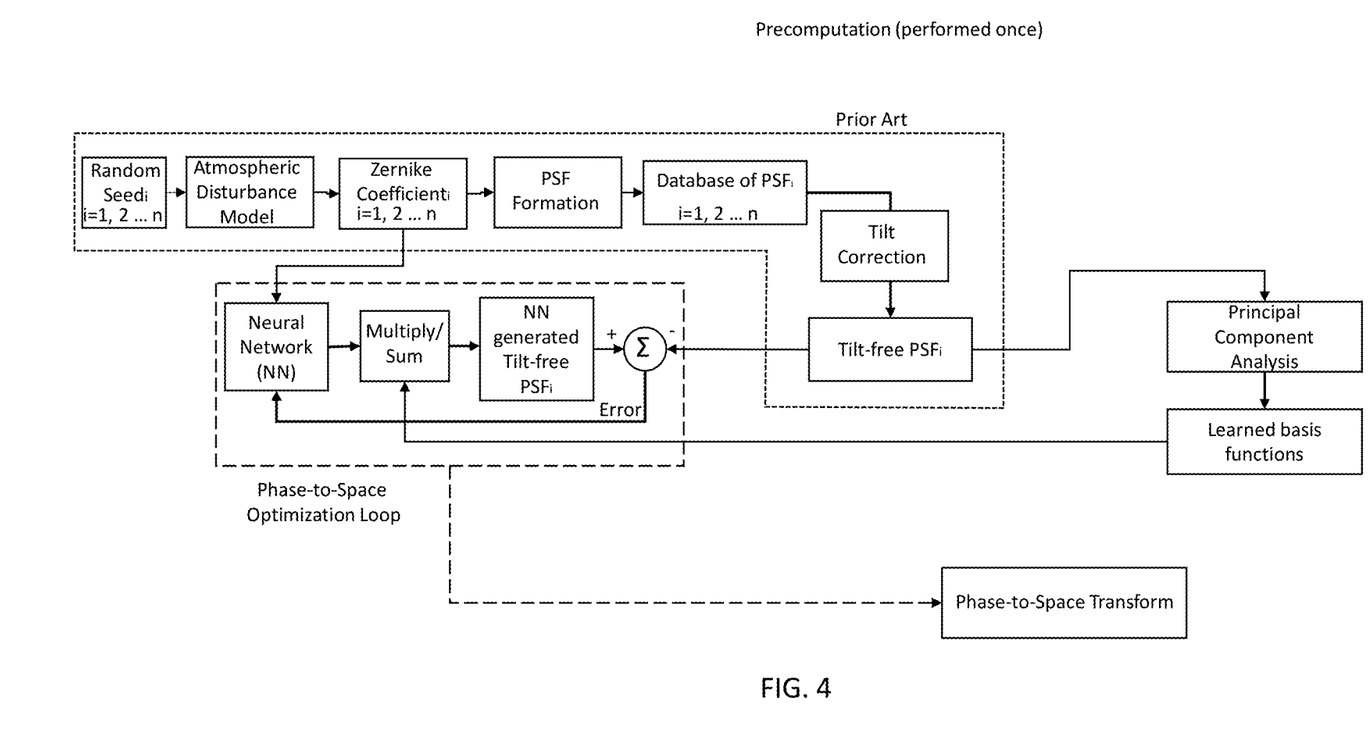
FIG. 4 is a block diagram which depicts three block associated with the fundamental concepts of the method/system of the present disclosure including 1) Convolution via basis functions; 2) Learning the basis functions; and 3) phase-to-space transform.

Referring to FIG. 4, three block associated with the fundamental concepts discussed above (i.e., 1) Convolution via basis functions; 2) Learning the basis functions; and 3) phase-to-space transform) are shown. Using random seeds (different seed sets are identified by the index i) as input to an atmospheric disturbance model, a set of coefficients referred to as Zernike coefficients (indexed by the same i) are generated. It should be appreciated that for each set of random seeds (i.e., for i=1, 2, . . . n), a different set of Zernike coefficients (also based on i=1, 2, n) are generated. These Zernike coefficients can source a database of point spread functions (PSFs) by use of the PSF formation equation. The PSFs are also indexed by the same index i (i.e., for each set of generated Zernike coefficients (based on i=1, 2, . . . n), a different of PSF is generated into the database). These different PSFs (based on i=1, 2, . . . n) are processed through a tilt correction to generate a tilt-free set of PSFs. This operation is known in the prior art as indicated in FIG. 4 by the dotted line. The PSF formation step is computationally costly.

The present disclosure provides a phase-to-transform (P2S) function which is based on a shallow neural network which receives the Zernike coefficients (based on i=1, 2, . . . n, discussed above). The output of the neural network is provided to a multiplier/summer block which carries out multiplications with the learned basis function and which is then summed to generate neural network (NN) generated tilt-free PSFs. These NN generated tilt-free PSFs are compared to tilt free PSFs from the prior art method to generate an error signal in the optimization/training of the NN. Once the NN has been optimized, the optimized NN constitutes the phase-to-space transform block. The tilt free PSFs from the prior art are also provided to a principal component analysis block to inspect for commonalities. The output of this block constitutes the learned basis functions that are used along with the multiply/sum block during the optimization phase of the NN. The optimization block is shown with long dashed lines.

It should be appreciated that while there is a significant amount of computational load for each set of Zernike coefficients to generate a corresponding tilt-free PSF, in the present disclosure that occurs once in order to train the NN. That is once the NN is trained (i.e., optimized by looping through the optimization loop), the heavy computation load between is not repeated as would be repeated in the method of prior art.

Figure 5:
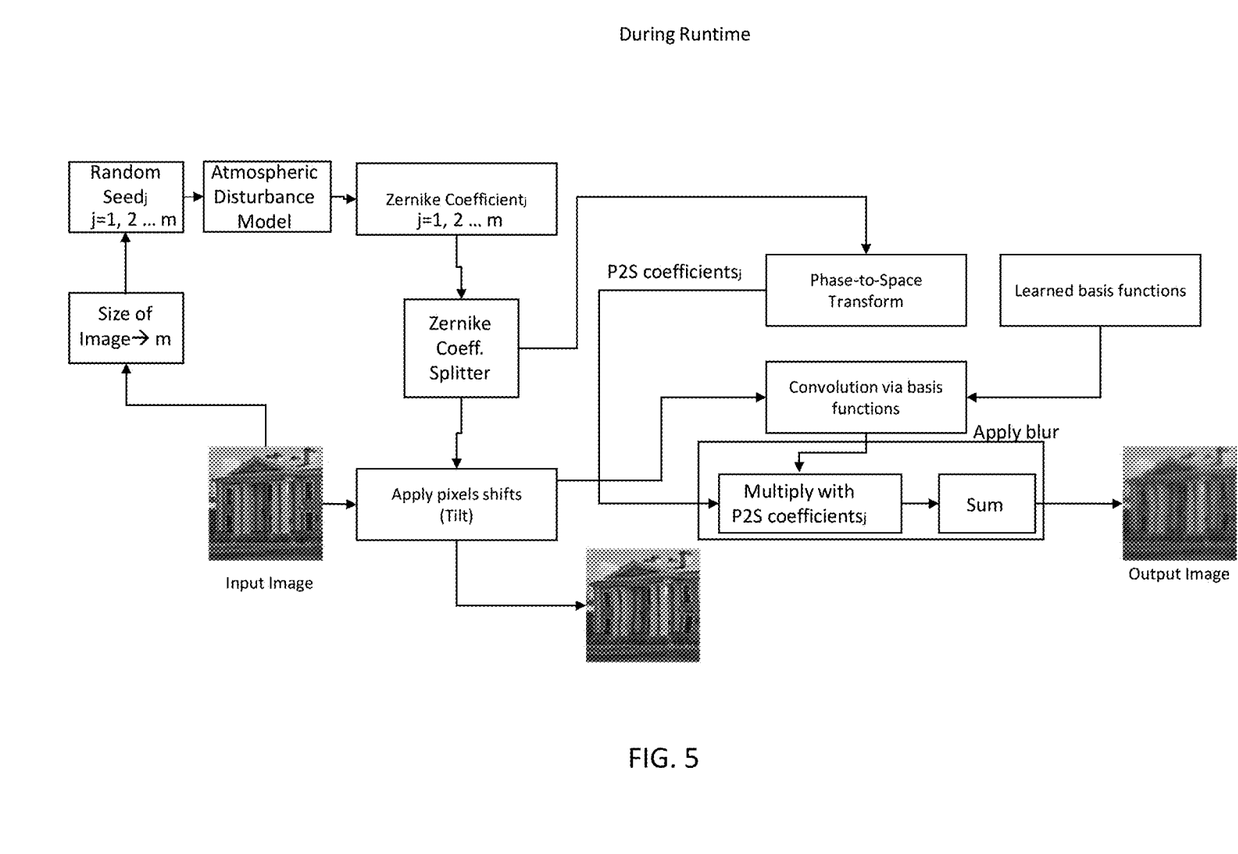
FIG. 5 is a block diagram which depicts the operation of the method/system of the present disclosure during runtime.

Referring to FIG. 5, the operation of the method/system of the present disclosure is provided during runtime. As before (i.e., as shown with reference to FIG. 4), a set of random seeds is provided to the atmospheric disturbance model which again generates Zernike coefficients, according to the processes known to a person having ordinary skill in the art. This process is based on index j which is identified as 1, 2, . . . m. It should be appreciated that the index j (ranging from 1 to m) and the previously described index i (ranging from 1 to n) can be the same index, however, two indexes are used to denote these indexes can be different. The number of pixels in the input image establishes the number of sets of Zernike coefficients (via the sets of random seeds). For example, if the image is of size m×m then there will be $m^2$ sets of random seed sets and $m^2$ sets of Zernike coefficients. Therefore, there is a one-to-one correspondence between each pixel to each Zernike set. Each set of random seed and/or Zernike coefficients may have a predetermined number of entries in said set. For example, a good tradeoff number may be 36. That is, each set of random seeds and each set of Zernike coefficients may have 36 entries in said set. A subset of the generated Zernike coefficients (based on index j=1, 2, . . . m), i.e., a fraction of each of the original sets, is configured to be provided to the Apply pixels shifts block, therefore, used for tilt which thus tilts pixels in the input image, as shown in FIG. 5. For example, if each set includes 36 entries, 2 entries of each set of Zernike coefficients are provided to the Apply pixels shifts block. These subsets are broken off from the original sets by the splitter block shown in FIG. 5. The remainder of the Zernike coefficients from each set (in the above example, remaining 34 entries of 36 entries) are then applied to the phase-to-space transform block that was generated according to the precomputation process shown in FIG. 4 as the output of the NN once the NN has been optimized, as described above. The phase-to-space transform block outputs P2S coefficients which are also based on the index j (i.e., each set of random seeds generates a set of Zernike coefficients, which then generates a set of P2S coefficients). It should be appreciated that the phase-to-space block represents a static entity, this varying inputs in the form of Zernike coefficients generates varying outputs in the form of P2S coefficients. The P2S coefficients (based on the index j=1, 2, . . . m) are then provided to a multiply block which multiplies these P2S coefficients with the output of a convolution block with its inputs being the tilted image and the learned basis function, described in reference to FIG. 4. In other words, the convolution block convolves the tilted image with the learned basis function and provides the convolved results to multiply block which multiplies the convolved output by the P2S coefficients based on the j index, each representing an output of the multiply block. These outputs are summed in a summer block, whose output constitutes the output image (which is tilted and has been distorted).

As alluded to above, the present disclosure includes two key building blocks: (1) reformulating the spatially varying convolution via a set of spatially invariant convolutions, (2) constructing the invariant convolutions by learning the basis functions. The key point is the linkage between the two for which we introduce the phase-to-space (P2S) transform to convert the Zernike coefficients to the PSF coefficients (i.e., the P2S coefficients).

The turbulent distortions can be modeled as a spatially varying convolution at each pixel. Denoting $x \in \mathbb{R}^N$ as the source image, and $y \in \mathbb{R}^N$ as the pupil image, the spatially varying convolution provides that y is formed by:

$$y = \begin{bmatrix} y_1 \\ \vdots \\ y_N \end{bmatrix} = Hx = \begin{bmatrix} h_1^T x \\ \vdots \\ h_N^T x \end{bmatrix},$$

where $\{h_n | n=1, \ldots, N\}$ are the N spatially varying PSFs stored as rows of the linear operator $H \in \mathbb{R}^{N \times N}$. Here $h_n$ is rewritten as:

$$h_n = \Sigma_{m=1}^M \beta_{m,n} \varphi_m,$$

for the basis function of the PSFs and coefficients $\beta_{m,n}$ of the $n^{th}$ basis at the $n^{th}$ pixel. Thus, each pixel $y_n$ can be presented as $$y_n = \Sigma_{m=1}^M \beta_{m,n} \varphi_m^T x, n=1, \ldots N.$$

Since convolution is linear, this turns the N spatially varying convolutions $\{h_n^T x\}_{n=1}^N$ into M spatially invariant convolutions $\{\varphi_m^T x\}_{m=1}^M$. If M<<N, the computational cost is much lower.

To enable the convolution using the basis functions, there are two quantities we need to learn from the data. These are the basis functions $\varphi_m$ and the coefficients $\beta_{m,n}$. If we are able to find both, the image can be formed by a simple multiply-add between the basis convolved images $\varphi_m^T x$ and the representation coefficients $\beta_{m,n}$, as described above, with reference to FIGS. 4 and 5.

To generate the basis functions $\varphi_m$, we consider the process described above of forming a zero-mean Gaussian vector with a covariance matrix $R_Z$ as known to a person having ordinary skill in the art. This covariance matrix describes the correlation in the Zernike coefficients which represent the proper atmospheric phase statistics. The strength of correlation is dictated by the optical parameters as well as the relationship $D/r_0$, where D is the aperture diameter and $r_0$ is the Fried parameter as known to a person having ordinary skill in the art.

To generate the basis functions $\{\varphi_m\}_{m=1}^M$, we use the above procedure to construct a dataset containing 50,000 PSFs (i.e., i=1, 2, . . . 50000) from weak to strong turbulence levels. Given the dataset, we perform a principal component analysis on the tilt-corrected PSFs. For the numerical experiments, a total of M=100 basis functions were used. This dataset is utilized again in the training of the P2S network.

With reference to the phase-to-space transform, the goal is to define a nonlinear mapping that converts the per-pixel Zernike coefficients $\alpha = [\alpha_1, \ldots, \alpha_K]$ aid to their associated PSF basis coefficients $\beta = [\beta_1, \ldots, \beta_M]$, where we've dropped the pixel index subscript n for notational clarity.

At the first glance, since the basis functions $\{\varphi_m\}_{m=1}^M$ are already found, a straightforward approach is to project the PSF h (which is defined at each pixel location) onto $\{\varphi_m\}_{m=1}^M$. However, doing so will defeat the purpose of skipping the retrieval of h from the Zernike coefficients as the PSF formation step represents a computational bottleneck. One may also consider analytically describing the PSF in terms of $\varphi_m$ and the Zernike coefficients:

$$h = |F\{W(\rho)e^{-j\phi(\rho)}\}|^2 \stackrel{?}{=} \Sigma_{m=1}^M \beta_m \varphi_m$$

However, doing so (i.e., establishing the above equality by writing an equation for $\beta_m$) is an open problem. Even if we focus on a special case with just a single Zernike coefficient, the calculation of the basis functions will involve non-trivial integration over the circular aperture.

To bypass the complication arising from the above equality, we introduce a computational technique. The idea is to build a shallow neural network to perform the conversion from $\alpha \in \mathbb{R}^K$ to $\beta \in \mathbb{R}^M$. We refer to the process as the phase-to-space transform and the network as the P2S network, as the input-output relationship is from the phase domain to the spatial (PSF) domain.

Given the two Zernike coefficients representing the tilts and the other Zernike coefficients representing the higher-order aberrations, the P2S transform uses the first two Zernike coefficients to displace the pixels, and uses the network to convert the remaining K–2 Zernike coefficients to M basis representations.

In terms of training, we re-use the 50,000 PSFs generated for the learning the basis functions to train the P2S network. From the previous effort in performing principal component analysis, the spatial basis coefficients can be determined through projection onto the basis function. In addition, the Zernike coefficients which were used in generating the PSFs (through the PSF formation equation) are also known. In other words, the database contains PSFs as well as phase and spatial domain coefficient pairs for each PSF. The goal of the P2S network is to find the nonlinear mapping between the phase and spatial domain coefficients. The training loss is defined as the $\ell_2$ distance between the NN produced tilt-free PSFs and the true tilt-free PSFs obtained via prior art. The network which performs the P2S transform is chosen to be lightweight as when applied to images it must be performed per pixel. For an image with a large field-of-view, the P2S network can be executed in parallel due to its lightweight nature. Therefore, even with a 512×512 image, the entire transformation is carried out in a single pass.

Most deep neural networks today are designed to handle color images. To ensure that our simulator is compatible with these networks, we extend it to handle color.

In principle, the spectral response of the turbulent medium is wavelength dependent, and the distortion must be simulated for a dense set of wavelengths. However, if the turbulence level is moderate, wavelength-dependent behavior of the Fried parameter is less significant for the visible spectrum (roughly 400 nm to 700 nm) when compared to other factors of the turbulence.

Figure 6A:
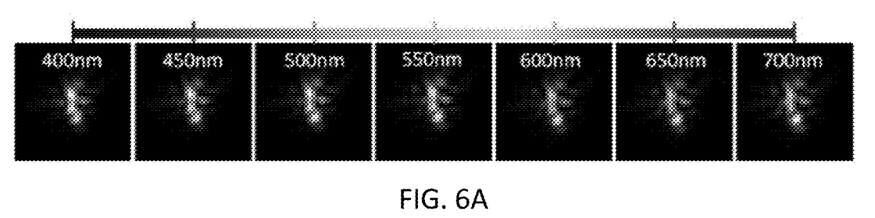
FIG. 6A depicts point spread functions (PSFs) across the visible spectrum.
Figure 6B:
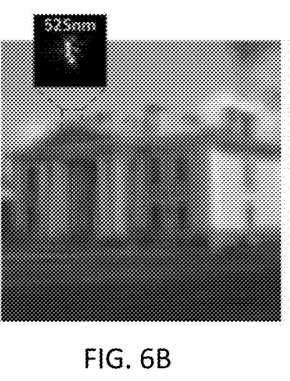
FIG. 6B depicts distortion applied using center wavelength of the visible spectrum.
Figure 6C:
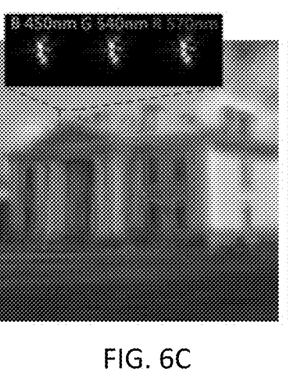
FIG. 6C depicts wavelength dependent distortions applied to three channels.
Figure 6D:
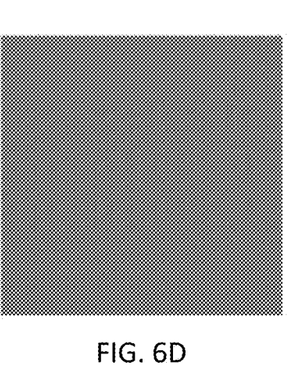
FIG. 6D depicts an error map between FIGS. 6B and 6C.

To illustrate this observation, we show in FIGS. 6A-6D the individual PSFs for several wavelength from 400 nm (blue) to 700 nm (red). It is evident that the shape of the PSFs barely changes from one wavelength to another. In the same figure, we simulate two color images. The first image is simulated by using a single PSF (525 nm) for the color channels (and displayed as an RGB image). The second image is simulated by considering 3 PSFs with wavelengths 450 nm, 540 nm, and 570 nm. We note that the image in FIG. 6C is a more realistic simulation but requires 3× computation. However, the similar PSFs across the colors makes the difference visually indistinguishable, as seen in FIG. 6D. The small gap demonstrated in these suggests that we can simulate the RGB channels identically in such conditions. Specifically, FIG. 6A depicts PSFs across the visible spectrum, while FIG. 6B depicts the same distortion applied to three channels using center wavelength of the visible spectrum, FIG. 6C depicts wavelength dependent distortions applied to three channels, and FIG. 6D depicts an error map between FIGS. 6B and 6C.

An experiment was conducted to demonstrate the impact of the proposed simulator on a multi-frame turbulence image reconstruction task. The goal of this experiment is to show that a deep neural network trained with the data synthesized by the proposed simulator outperforms the same network trained with the data generated by simulators that are less physically justified.

To demonstrate the impact of the simulator, we do not use any sophisticated network structure or training strategy. Our network has a simple U-Net architecture with 50 input channels and is trained with an MSE loss for 200 epochs. The network is trained with 5000 simulated sequences, where each sequence contains 50 degraded frames. The ground truth images used for simulation are obtained from the Places dataset. The sequences are simulated with a turbulence level $D/r_0$ uniformly sampled from the prior art. For comparison, we train the same network using a simulation technique proposed by the prior art.

Figure 7A:
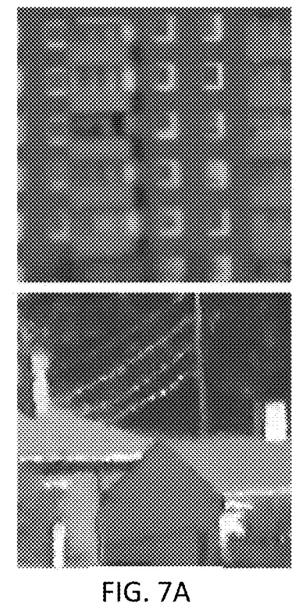
FIG. 7A depicts an original image.
Figure 7B:
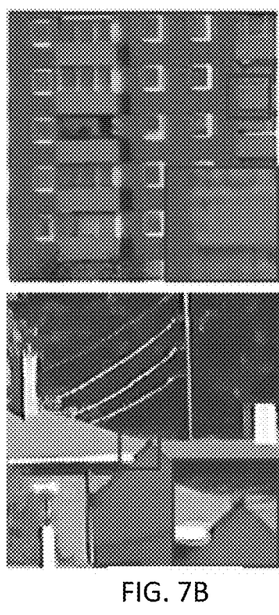
FIG. 7B depicts a reconstructed image from an image reconstruction system (U-Net) receiving input date from an example prior art simulator.
Figure 7C:
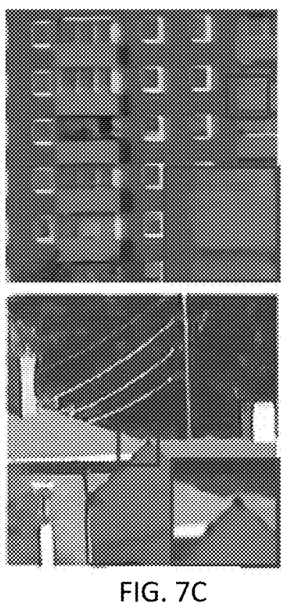
FIG. 7C depicts a reconstructed image from the same image reconstruction system (U-Net) receiving input date from the image generator engine of the present disclosure.

Two qualitative reconstruction results are shown in FIGS. 7A, 7B, and 7C. It can be seen that the network trained with the image generator engine of the present disclosure has performance close to state-of-the-art. Specifically, FIG. 7A depicts an original image, FIG. 7B depicts a reconstructed image from an image reconstruction system (U-Net) receiving input date from an example prior art simulator, and FIG. 7C depicts a reconstructed image from the same image reconstruction system (U-Net) receiving input date from the image generator engine of the present disclosure. Visible artifacts are generated from the network trained with prior art. We also include a quantitative evaluation, where a prior art simulator is used to generate 30 testing sequences under low, medium, and high ($D/r_0$=1.5, 3, and 4.5). PSNR values are reported in Table 1. It is worth nothing that the network trained with the data synthesized by our simulator achieves a comparable performance to the state-of-the-art.

TABLE 1

PSNR values of the reconstruction results, averaged over 30 testing sequences

| $D/r_0$ | Ours + U-Net | [17]* + U-Net |
|---|---|---|
| 1.5 | 27.18 dB | 26.59 dB |
| 3.0 | 26.98 dB | 26.11 dB |
| 4.5 | 26.01 dB | 25.40 dB |

*Chun Pong Lau and Lok Ming Lui. Subsampled turbulence removal network. Mathematics, Computation and Geometry of Data, 1(1): 1-33, 2021.

Those having ordinary skill in the art will recognize that numerous modifications can be made to the specific implementations described above. The implementations should not be limited to the particular limitations described. Other implementations may be possible.

The invention claimed is:

1. An image generator engine for generating distorted images from an input image, comprising:
a random seed generator adapted to generate a first plurality of sets of random seeds (FPSRS), the number of sets of random seeds corresponds to the number of pixels in the input image;
an atmospheric disturbance model adapted to receive the FPSRS and in response thereto generate a first plurality of sets of Zernike coefficients (FPSZC), each set of Zernike coefficients of the FPSZC corresponding to an associated set of random seeds of the FPSRS, and each set of Zernike coefficients of the FPSRS and each set of random seeds of the FPSRS comprising a plurality of corresponding entries;
a pixel shifter adapted to receive in parallel a subset of the entries of the FPSZC and the input image, and in response thereto shift the corresponding pixel of the input image to thereby generate a tilted image;
a phase to space (P2S) transformer adapted to in parallel receive remainder of entries (RoE) of the FPSZC and in response generate a predetermined number of P2S coefficients (PNP2SC) defining a non-linear mapping of the plurality of sets of Zernike coefficients to associated point spread functions (PSFs) basis coefficients;
a learned basis function generator adapted to receive tilt-free PSFs from a plurality of PSFs generated corresponding to a second plurality of sets of Zernike coefficients (SPSZC) generated from the atmospheric disturbance model receiving a second plurality of sets of random seeds (SPSRS), wherein each set of Zernike coefficients of the SPSZC corresponding to an associated set of random seeds of the SPSRS, and each set of Zernike coefficients of the SPSZC and each set of random seeds of the SPSRS comprising a plurality of corresponding entries and perform a principal component analysis on the tilt-free PSFs, thereby generating the learned basis functions represented as PNP2SC matrices;
a convolver adapted to convolve each pixel of the tilted image by the learned basis functions thereby generating a plurality of convolved pixels; and
a blurrer adapted to receive the plurality of the convolved pixels and multiply by the corresponding P2S coefficients and apply a summation to generate the distorted image.

2. The image generator engine of claim 1, wherein the number of entries in each set of the first plurality of sets of Zernike coefficients includes 36 entries.

3. The image generator engine of claim 1, wherein the subset of the entries of the FPSZC includes 2 subsets.

4. The image generator engine of claim 3, wherein the P2S transformer is a neural network.

5. The image generator engine of claim 4, the neural network adapted to receive RoE of the SPSZC and outputs PNP2SC interim P2S coefficients during an optimization process, whereby each of the PNP2SC interim P2S coefficients is multiplied by a corresponding learned basis function matrix, and the resulting matrices added together to generate a neural network generated tilt-free PSF which is compared with a corresponding predetermined tilt-free PSF to generate an error signal which is minimized.

6. The image generator engine of claim 5, wherein the error minimization is by least squares.

7. The image generator engine of claim 5, wherein the P2S transformer is the neural network after minimization of the error signal.

8. The image generator engine of claim 4, wherein the neural network includes RoE inputs, PNP2SC outputs and three fully connected layers.

9. The image generator engine of claim 1, wherein the number of sets in the FPSZC is m×n, where m is number of pixels in the X-direction and n is number of pixels in the Y-direction.

10. The image generator engine of claim 1, wherein the number of sets in the FPSRS is m×n, where m is number of pixels in the X-direction and n is number of pixels in the Y-direction.

11. A method of generating distorted images from an input image, comprising:
generating a first plurality of sets of random seeds (FPSRS), the number of sets of random seeds corresponds to the number of pixels in the input image;
modeling atmospheric disturbances by applying an atmospheric disturbance model adapted to receive the FPSRS and in response thereto generate a first plurality of sets of Zernike coefficients (FPSZC), each set of Zernike coefficients of the FPSZC corresponding to an associated set of random seeds of the FPSRS, and each set of Zernike coefficients of the FPSRS and each set of random seeds of the FPSRS comprising a plurality of corresponding entries;
shifting pixels in the input image by a pixel shifter adapted to receive in parallel a subset of the entries of the FPSZC and the input image, and in response thereto shift the corresponding pixel of the input image to thereby generate a tilted image;
applying a phase to space (P2S) transformer adapted to in parallel receive remainder of entries (RoE) of the FPSZC and in response generate a predetermined number of P2S coefficients (PNP2SC) defining a non-linear mapping of the plurality of sets of Zernike coefficients to associated point spread functions (PSFs) basis coefficients;
generating a learned basis function by a learned basis function generator adapted to receive tilt-free PSFs from a plurality of PSFs generated corresponding to a second plurality of sets of Zernike coefficients (SPSZC) generated from the atmospheric disturbance model receiving a second plurality of sets of random seeds (SPSRS), wherein each set of Zernike coefficients of the SPSZC corresponding to an associated set of random seeds of the SPSRS, and each set of Zernike coefficients of the SPSZC and each set of random seeds of the SPSRS comprising a plurality of corresponding entries and perform a principal component analysis on the tilt-free PSFs, thereby generating the learned basis functions represented as PNP2SC matrices;
convolving by a convolver each pixel of the tilted image by the learned basis functions thereby generating a plurality of convolved pixels; and
applying a blurrer adapted to receive the plurality of the convolved pixels and multiply by the corresponding P2S coefficients and apply a summation to generate the distorted image.

12. The method of claim 11, wherein the number of entries in each set of the first plurality of sets of Zernike coefficients includes 36 entries.

13. The method of claim 11, wherein the subset of the entries of the FPSZC includes 2 sub sets.

14. The method of claim 13, wherein the P2S transformer is a neural network.

15. The method of claim 14, the neural network adapted to receive RoE of the SPSZC and outputs PNP2SC interim P2S coefficients during an optimization process, whereby each of the PNP2SC interim P2S coefficients is multiplied by a corresponding learned basis function matrix, and the resulting matrices added together to generate a neural network generated tilt-free PSF which is compared with a corresponding predetermined tilt-free PSF to generate an error signal which is minimized.

16. The method of claim 15, wherein the error minimization is by least squares.

17. The method of claim 15, wherein the P2S transformer is the neural network after minimization of the error signal.

18. The method of claim 14, wherein the neural network includes RoE inputs, PNP2SC outputs and three fully connected layers.

19. The method of claim 11, wherein the number of sets in the FPSZC is m×n, where m is number of pixels in the X-direction and n is number of pixels in the Y-direction.

20. The method of claim 11, wherein the number of sets in the FPSRS is m×n, where m is number of pixels in the X-direction and n is number of pixels in the Y-direction.

* * * * *